(No Model.)
J. H. WESTCOTT.
LATHE CHUCK.
No. 315,685.  Patented Apr. 14, 1885.
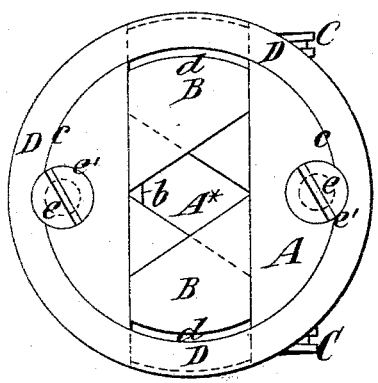
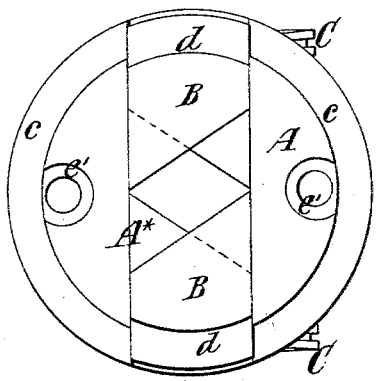
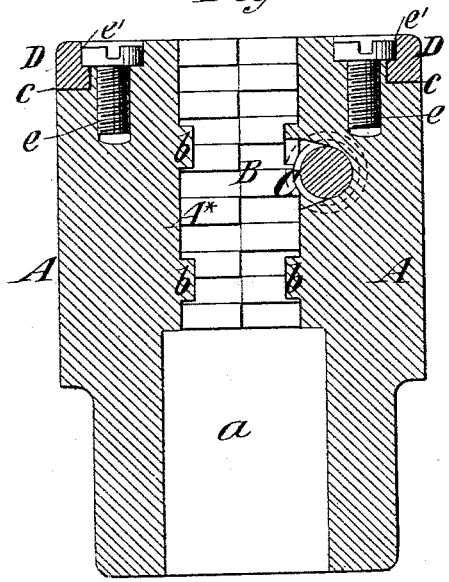
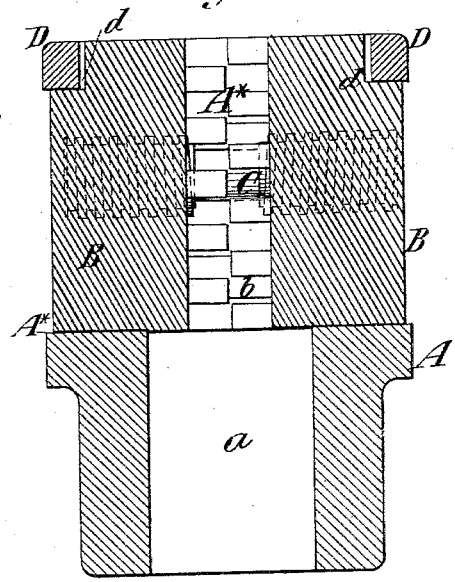
Witnesses:
Inventor:
John H. Westcott

UNITED STATES PATENT OFFICE.

JOHN H. WESTCOTT, OF ONEIDA, NEW YORK.

LATHE-CHUCK.

SPECIFICATION forming part of Letters Patent No. 315,685, dated April 14, 1885.

Application filed December 10, 1884. (No model.)

*To all whom it may concern:*

Be it known that I, JOHN H. WESTCOTT, of Oneida, in the county of Madison and State of New York, have invented a new and useful Improvement in Chucks, of which the following is a specification.

My invention relates more particularly to chucks having two jaws with V-shaped faces, which are fitted in a slot or channel extending diametrically across the chuck-body, and are moved toward and from each other by a worm or screw having right and left hand threads; but the invention may be embodied in any chucks in which the slots, seats, or channels for the jaws extend entirely to the outer end of the body and to the circumference thereof. When the chuck-body is thus cut away, it is considerably weakened, and in order to prevent its springing or splitting I re-enforce it by applying thereto a ring which encircles the chuck-body, and preferably fits in a circumferential rabbet formed in the outer end of the body. I also notch the jaws at the junction of their ends and edges, and make them to project through the ring to the outer face thereof and to the end of the chuck-body, and then the ring also serves as a stop to prevent the opening of the jaws to take an article larger than the chuck is intended for and to an extent which would endanger the worm or screw by reducing the engagement of its threads with the jaws.

In the accompanying drawings, Figure 1 is an axial section of a chuck embodying my invention, in a plane at right angles to the line of movement of the jaws. Fig. 2 is a similar section taken in the plane of movement of the jaws. Fig. 3 is a front end view of the complete chuck; and Fig. 4 is a front end view of the chuck body and jaws, the ring being removed.

Similar letters of reference designate corresponding parts in all the figures.

A designates the body of the chuck, which may be of steel, and in one end of which is a socket, *a*, which is intended to receive a spindle on which the chuck is to be used. This socket may be screw-threaded internally, or left plain and secured on a spindle by a set-screw.

In the body A is formed a slot or channel, A*, which extends diametrically across it entirely to its circumference and from its outer end inward. The side walls of this channel or slot are provided with ribs *b*, and it forms seats wherein are fitted jaws B, which have or may have V-shaped faces, and which are moved toward and from each other, to open and close the chuck, by a worm or screw, C, having right and left hand threads, which engage with similar female threads or nuts on the sides of the jaws.

Although the slot or channel A* may be formed at one operation, it may be considered as forming two slots or seats for the two jaws.

The outer end of the chuck-body A is encircled by a ring, D, which preferably fits in a circumferential rabbet, *c*, in the outer end of the body and re-enforces the body. This ring enables the body to be made of very small size, and adds the necessary strength to prevent the body from springing, and so allowing the drill to become out of truth, and to prevent the body from splitting when subjected to any great strain, as is caused by holding a square shank tap in the jaws. I prefer also to make the jaws B of such length that they will extend to the end of the body, and to notch them at the junction of their outer ends and edges, as at *d*, so that their ends will project into the ring D. The ring will then form a stop to prevent the jaws from being spread or opened to take in an article larger than the chuck is intended for, and to prevent the jaws from being spread to such extent that the very slight hold which the worm C has upon them will render the threads of the worm or jaws liable to be broken off or injured.

The ring D may be screwed on, secured by pins inserted at its circumference, or by any other suitable means. I have here shown screws *e*, which are tapped into the body A, adjacent to the ring, and the heads of which fit in countersinks *e'*, formed partly in the body and ring, and therefore overlap the ring.

What I claim as my invention, and desire to secure by Letters Patent, is—

1. The combination, with a chuck-body having slots or seats which extend to the circumference and to the outer end of the body, of jaws fitting said slots or seats, and a re-enforcing ring, D, encircling the outer end of the body, substantially as herein described.

2. The combination, with a chuck-body having slots or seats which extend to the circumference and outer end of the body, and having a circumferential rabbet, c, of jaws fitting said slots or seats, and a re-enforcing ring, D, encircling the chuck-body and fitting in said rabbet, substantially as herein described.

3. The combination, with a chuck-body having slots or seats which extend to its circumference and outer end, and having the rabbet c, of jaws fitting said slots or seats and notched at d, and a re-enforcing ring, D, encircling the chuck-body in said rabbet, and also forming a stop to the jaws, substantially as herein described.

JOHN H. WESTCOTT.

Witnesses:
J. H. ANDERSON,
C. A. WESTCOTT.